Oct. 30, 1951  W. G. HADDRELL  2,573,013
FILM EDITING EQUIPMENT
Filed June 19, 1946  2 SHEETS—SHEET 1
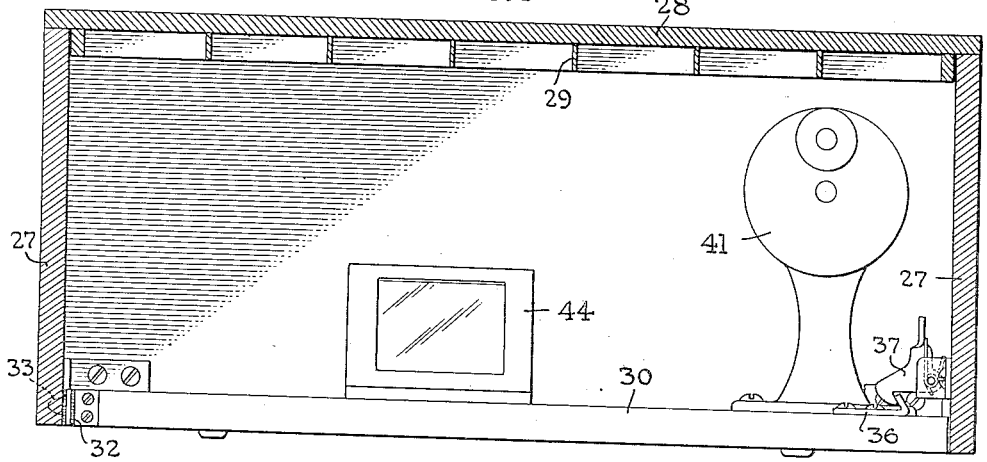
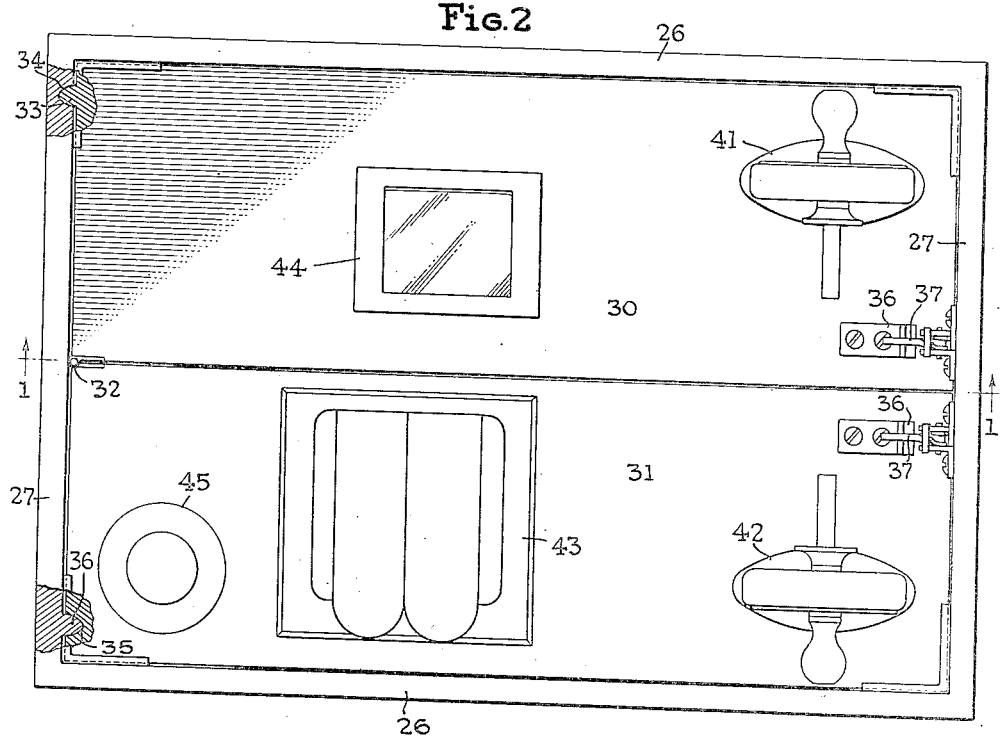
INVENTOR:-
Walter G. Haddrell,
BY
Fisher & Christen,
Attorneys.

Oct. 30, 1951
W. G. HADDRELL
2,573,013
FILM EDITING EQUIPMENT
Filed June 19, 1946
2 SHEETS—SHEET 2
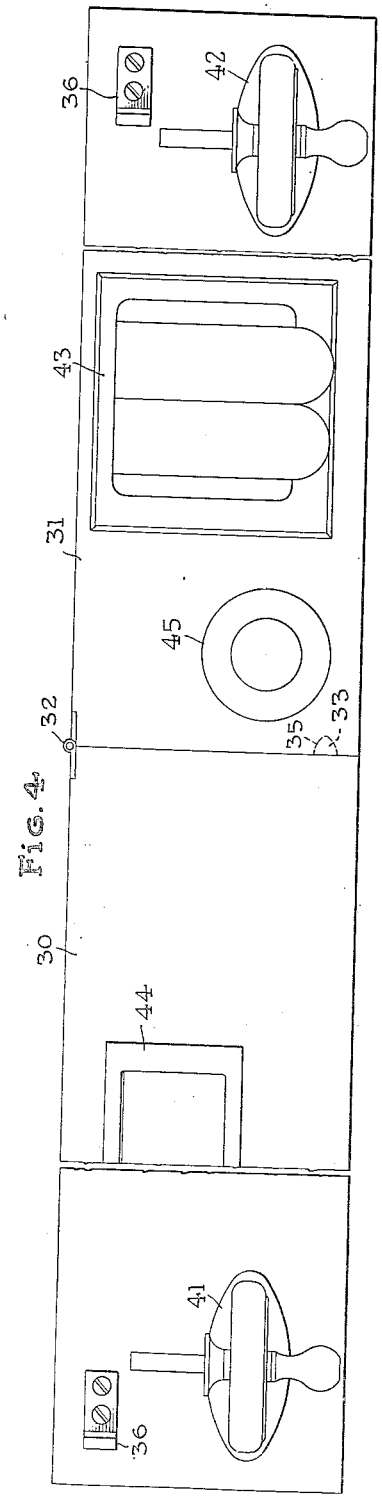
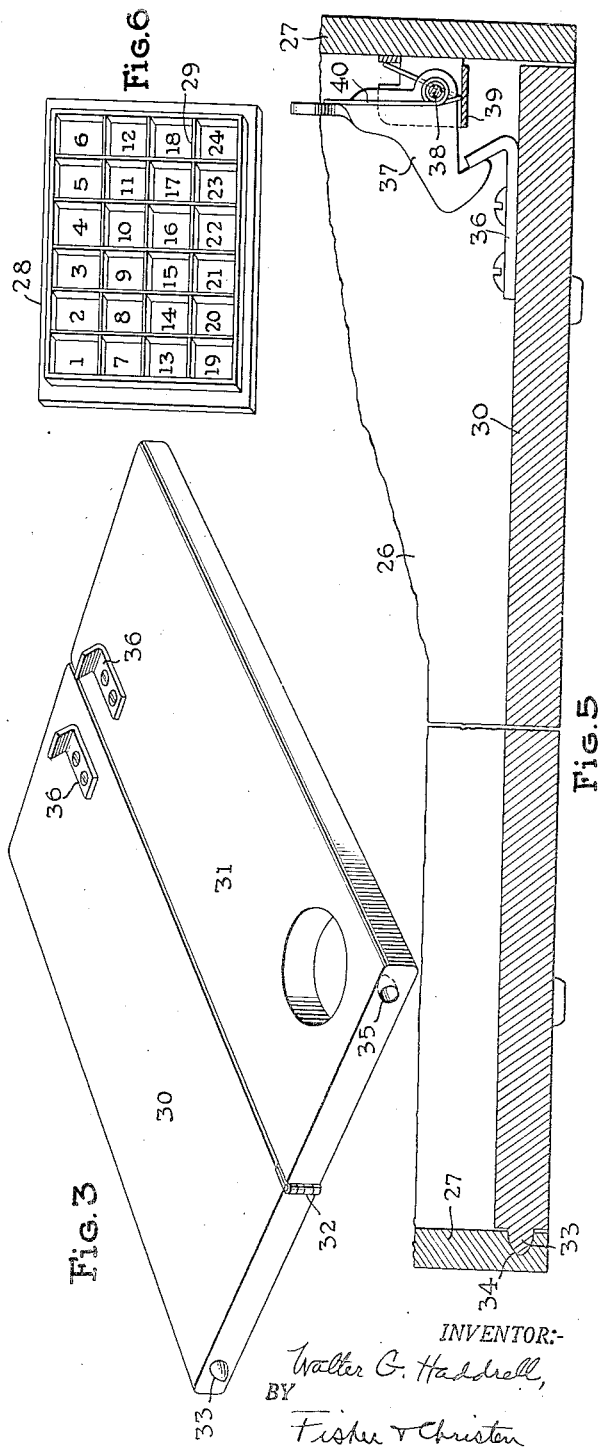
INVENTOR:-
Walter G. Haddrell,
BY
Fisher & Christen,
Attorneys.

Patented Oct. 30, 1951

2,573,013

UNITED STATES PATENT OFFICE 2,573,013

FILM EDITING EQUIPMENT

Walter G. Haddrell, Saltville, Va.

Application June 19, 1946, Serial No. 677,733

1 Claim. (Cl. 312—20)

This invention relates to film editing equipment, and more particularly to a compact and readily portable kit for editing motion picture film.

In an application filed November 6, 1946, Serial No. 708,089 entitled, "Film Editing Kit" I have described and claimed certain improvements and modifications in this type of apparatus.

Motion picture film editing equipment for use by the amateur photographer for editing sub-standard film, such as 8 mm., 16 mm., or 9.5 mm., is available on the market today. Such film editing equipment usually comprises a holder for the supply reel and a holder for the take-up reel, with viewing and splicing devices, all well known, positioned between the two reels, so that the pictures may be examined individually, and any cutting out, re-arranging, splicing and the like be accomplished as the film is progressed from one reel to the other.

The principal object of this invention is to provide a combined receptacle carrying case and mounting means for such film editing equipment.

More specifically, an important object of the invention is to provide a receptacle or container for such equipment, where the equipment is mounted on the bottom of the receptacle, and where the bottom is readily detachable from the walls of the receptacle and can be spread out to position the several devices used in editing film, in convenient and workable position; and where the top or one or more sides of the receptacle is detachable or semi-detachable, and has, on the inside, a cellular type of construction to hold pieces of film during the editing process.

More specifically, the invention comprises a detachable bottom in the form of two or more bottom boards, on which the film editing devices are mounted. These bottom boards are positionable alongside each other when in place in the receptacle, but when removed therefrom they are positioned and held in alinement with each other for the film editing operation.

In the preferred form of the invention, two bottom boards are hinged together at one corner so that they may be swung into side-by-side relation, or into alinement with each other, and suitable detachable means are provided cooperating with each board for detachably holding them in place in the receptacle, and in alinement with each other when removed from the receptacle.

Another important feature of the invention is to provide means for conveniently holding pieces of film during the editing process. To this end, the receptacle is provided with individual cells or compartments, preferably on the inside of the detachable or semi-detachable cover, which cells may be individually numbered or lettered and a suitable index kept for identifying particular film scenes with particular cells. Similar cells could be provided, if desired, on the inside of any detachable or semi-detachable wall of the receptacle.

Further features of the invention will be described in connection with the accompanying drawings illustrating the preferred embodiment thereof. In these drawings:

Fig. 1 is a vertical longitudinal cross section of the film editing equipment, taken on the lines 1—1 of Fig. 2.

Fig. 2 is a top plan view of Fig. 1, with the top removed, with parts shown in section.

Fig. 3 is a perspective view of the detachable bottom in folded position.

Fig. 4 is a plan view of the detachable bottom in extended position.

Fig. 5 is a vertical longitudinal section through the bottom of the receptacle.

Fig. 6 is a perspective view on a reduced scale, of the inside of the cover.

Referring now to these drawings, the receptacle comprises vertical side walls 26, end walls 27 and a top 28. The inside of the top is provided with partitions 29 arranged at right angles to each other to define individual compartments, numbered from 1 to 24, inclusive, for receiving and holding pieces of film. The user, of course, keeps an index of the scenes on the pieces of film with the numbers of the respective compartments for thereby identifying particular pieces of film filed or temporarily placed therein, preparatory to rearranging and assembling the finished film. The cover 28 is preferably completely removable from the receptacle, although, of course, it could be hinged, latched or otherwise secured thereto, as desired. One or more handles for the receptacle may be provided as necessary.

The bottom of the receptacle is formed of two bottom boards 30 and 31, hinged together at one corner with hinge 32, so that the boards may be positioned in parallel, side-by-side relation, as in Fig. 3, or in extended position in alinement, as in Fig. 4.

These two bottom boards, when in side-by-side relation as in Fig. 3, are detachably secured in that position in the receptacle to form the bottom thereof. Such detachable connections could take several different forms, such as a dowel pin 33 at one end of one board 30, which pin is seatable in the dowel socket 34 in the lower edge of one end wall 27. The other board 31 has a dowel socket 35 for receiving a dowel 36 carried by the same end wall 27. Dowel 33 and socket 35 are so positioned that they interengage, as shown in Fig. 4, for holding the two boards in alinement when in the unfolded position.

Some form of manually operable, readily disengageable bolt or latch means is provided at the other ends of the bottom boards, such, for example, as metallic keepers 36, secured to the bottom boards, each engageable with a pivoted latch 37 mounted on pivot 38 positioned in a bracket 39, secured to the other end wall 27. A spring 40 urges the latch 37 into engagement with the keepers 36.

In operation, and with the bottom boards in position as in Figs. 2 and 5, the bottom is held in position by the dowels and the latches. In order to remove the bottom, the latches are disengaged from their keepers, the bottom lowered an inch or two, the dowels then disengaged from their respective sockets, and the bottom boards completely removed. The bottom boards are then swung into alinement as in Fig. 4, ready for the film editing operation.

Any desired forms of film editing equipment may be mounted on the bottom boards. A holder for a supply reel, for example as shown at 41, and a holder for a take-up reel, as shown at 42, are mounted at opposite ends of the boards, and at suitable intermediate positions are mounted a splicing device 43, a viewing device 44, one or more receptacles 45 for cement, etc., as desired.

The receptacle may conveniently be of wood, although metal, fiber board, etc., could be used as desired. The term "bottom boards" as used in the claim is not intended to limit the material to wood. While two bottom boards are ordinarily used, more than two could evidently be used, if desired.

There has thus been provided a compact editing kit of a convenient and readily portable size, in which the necessary spread between the supply and take-up reels is provided by the detachable bottom boards which may be unfolded into alinement, to position such reels at opposite ends of the apparatus, with an adequate amount of space between the reels for the viewing, splicing, lettering and similar devices.

While the preferred form of the invention has been illustrated in some detail, it should be understood that the invention is not to be limited to these details, but may be carried out in other ways.

I claim as my invention:

Film editing equipment comprising a receptacle having a top and side walls, a readily detachable bottom for said receptacle, said bottom comprising a pair of bottom boards hinged together at one corner so as to be foldable into alinement when detached from the receptacle, for thereby providing an elongated base for film editing equipment twice the length of the receptacle, said bottom boards being also foldable alongside one another to form the bottom of the receptacle, and means including manually operated latches, for holding the bottom boards in place to form the bottom of the receptacle, said means serving to quickly release said bottom boards for complete removal from the receptacle whereby they can be placed in alinement as aforesaid for use in film editing operations.

WALTER G. HADDRELL.

REFERENCES CITED

The following references are of record in the file of this patent:

UNITED STATES PATENTS

| Number | Name | Date |
|---|---|---|
| 1,144,398 | Thommen | June 29, 1915 |
| 1,144,736 | Smith | June 29, 1915 |
| 1,507,760 | Sutherland | Sept. 9, 1924 |
| 2,218,256 | Bechtel | Oct. 15, 1940 |

OTHER REFERENCES

"Home-Made Film Editing Case," by Earl Antrim in "American Cinematographer" for November 1942. Pages 483 and 996.